(12) United States Patent
McConnell

(10) Patent No.: US 10,729,106 B2
(45) Date of Patent: Aug. 4, 2020

(54) CONNECTOR ASSEMBLY FOR LEASH SYSTEM

(71) Applicant: Peter McConnell, San Diego, CA (US)

(72) Inventor: Peter McConnell, San Diego, CA (US)

(73) Assignee: Peter McConnell, San Diego, CA (US)

( * ) Notice: Subject to any disclaimer, the term of this patent is extended or adjusted under 35 U.S.C. 154(b) by 50 days.

(21) Appl. No.: 15/974,110

(22) Filed: May 8, 2018

(65) Prior Publication Data

US 2018/0332828 A1     Nov. 22, 2018

Related U.S. Application Data

(60) Provisional application No. 62/507,031, filed on May 16, 2017.

(51) Int. Cl.
*A01K 27/00*     (2006.01)

(52) U.S. Cl.
CPC .................................. *A01K 27/005* (2013.01)

(58) Field of Classification Search
CPC .......................... A01K 27/005; Y10T 24/45529
See application file for complete search history.

(56) References Cited

U.S. PATENT DOCUMENTS

| | | | | |
|---|---|---|---|---|
| 3,171,183 A | * | 3/1965 | Johnston | A01K 91/03 24/635 |
| 3,540,089 A | * | 11/1970 | Franklin | A01K 27/005 24/602 |
| 5,450,820 A | * | 9/1995 | Kirsch | A01K 27/005 119/865 |
| 6,003,213 A | * | 12/1999 | Keller | A44B 11/2534 24/615 |
| 2009/0241306 A1 | * | 10/2009 | Pontaoe | A44B 11/2534 24/614 |

* cited by examiner

*Primary Examiner* — Robert Sandy
(74) *Attorney, Agent, or Firm* — Roeder & Broder LLP; James P. Broder

(57) ABSTRACT

A connector assembly for a leash system including a connector and a connector receiver. The connector includes a first connector end that has a connector end center. The connector receiver includes a first gate that moves between a locked and an unlocked position. The first gate defines at least a portion of a connector cavity, with the connector cavity selectively receiving the first connector end when the first gate is in the unlocked position. The connector cavity also has a cavity center, with the cavity center and the connector end center being substantially identical when the first connector end is received by the connector cavity. The connector receiver further includes a receiver actuator that is coupled to the first gate. The receiver actuator can move in a first direction and a second direction, wherein moving the receiver actuator in the second direction moves the first gate to the unlocked position.

20 Claims, 10 Drawing Sheets

CONNECTOR ASSEMBLY FOR LEASH SYSTEM

RELATED APPLICATION

This application claims priority on U.S. Provisional Application Ser. No. 62/507,031, filed on May 16, 2017, and entitled "MODULAR ANIMAL LEASH." As far as permitted, the contents of U.S. Provisional Application Ser. No. 62/507,031 are incorporated herein by reference.

BACKGROUND

Pet leashes, such as for dogs, share a common function—to keep a dog safe and under control in outdoor and public places. However, each pet is different, and temperament and training needs often determine which type of leash system is best for each pet.

In order to accommodate the varying sizes, temperaments or behaviors of pets, leashes have been designed having fixed lengths, variable lengths, or in combination. The length of the leash is one important aspect of the leash. Leashes that are too long do not provide sufficient control of the pet which can result in undesirable accidents, whereas leashes that are too short can be uncomfortable for both the pet and the user.

The standard leash generally has a fixed length and a fixed loop at one end to serve as a handle. The fixed length of the standard leash can often result in a leash which is loose, not taut, between the end attached to the dog and the opposite end held by the user, attached to fixed objects, such as trees or poles, or attached to other moveable objects. Similarly, the fixed loop can make it difficult to attach to fixed or moveable objects of varying shapes or sizes resulting in a loose leash or loose attachment. The loose leash or attachment can cause the standard leash to fall to the ground when attached to fixed objects, which may allow the dog to urinate on the standard leash. Further, the standard leash can be susceptible to getting tangled around the dog, the user or the fixed or moveable object. Another disadvantage of the standard leash is that when attached to fixed or moveable objects the standard leash generally must be tied in a knot which can contribute to the breakdown of the leash or make it more difficult to attach or untie.

Retractable leashes can be convenient for both the pet and the user. However, while the retractable leash allows for variable lengths, it can only provide limited control. Specifically, it is difficult to keep larger or particularly energetic or stronger pets under control. Retractable leashes can also allow the pet to accelerate to a significant speed before being stopped suddenly, which can present the possibility of injury to both the pet and the user. Furthermore, retractable leashes can be difficult to attach to fixed or moveable objects or may not be able to attach to fixed or movable objects, such as user, altogether.

Additionally, both standard and retractable leashes can be difficult to hold and can cause finger and hand fatigue for users of larger or particularly energetic or stronger pets or those that walk their pet for a prolonged period of time. For example, standard leashes often include the fixed loop that serves as a handle, which can cut into or burn the user's hand when the pet pulls. Retractable leashes often include relatively large and bulky handles in order to house retractable components. Accordingly, the user that utilizes standard and/or retractable leashes can have difficulty keeping the leashes in their hand depending on the activity or behavior of the pet. Furthermore, larger or particularly energetic or stronger pets can be difficult to control during leash-constrained activities in that the pet may run in front of, behind, or side to side the user, and often with great force in an effort to break free of the leash. This action by the pet, in addition to the handle design, can be challenging both to the user and to the pet. Specifically, the user may have difficulty holding onto the fixed loop or handle of standard and/or retractable leashes or simply grow weary in doing so.

As a result, standard and/or retractable leashes do not adequately account for the varying temperaments and behaviors of pets, or the varying lifestyle of their owners or users. More specifically, standard and/or retractable leashes can limit or inhibit the ability of the user to make adjustments during diverse leash-constrained activities depending on the behavior of the pet.

SUMMARY

The present invention is directed toward a connector assembly for a leash system. In various embodiments, the connector assembly includes a connector and a connector receiver. The connector includes a first connector end. In certain embodiments, the first connector end can include a connector end center. The connector receiver includes at least a first gate that moves between a locked and an unlocked position. In various embodiments, the first gate can be biased towards the locked position. The first gate can define at least a portion of a connector cavity. The connector cavity selectively receives the first connector end when the first gate is in the unlocked position. In some embodiments, the connector cavity can also include a cavity center. In certain embodiments, the connector end center and the cavity center are substantially identical when the first connector end is received by the connector cavity.

In some embodiments, the first connector end can have a somewhat spherical configuration. The connector cavity may also have a partially spherical shape. With this configuration, the first connector end can have a diameter that is substantially similar to a diameter of the connector cavity.

In certain embodiments, the connector receiver can further include a receiver assembly that includes a receiver actuator that is coupled to the first gate. More specifically, the connector receiver can include a first gate attachment member that can couple the first gate to the receiver actuator. The receiver actuator can include a switch, a lever, a button or a slidable element, as non-exclusive examples. The receiver actuator can move the first gate between the locked position and the unlocked position. In various embodiments, the receiver actuator is biased in a first direction that selectively maintains the first gate in the locked position. The receiver actuator can also be movable in a second direction that moves the first gate to the unlocked position. In one embodiment, the receiver assembly can be configured to allow insertion of the first connector end into the connector cavity absent manual movement of the receiver actuator.

Additionally, in various embodiments, the connector receiver can include a second gate that is coupled to the first gate. The second gate can form at least a portion of the connector cavity. With this configuration, the first gate and the second gate can be configured to engage at least a portion of the first connector end. Furthermore, in some embodiments, the connector receiver can have a pivot axis and a longitudinal axis, wherein the pivot axis can be substantially perpendicular to the longitudinal axis. In various embodiments, the first gate and the second gate can rotate about the pivot axis.

The present invention is further directed toward a connector assembly for a leash system. In certain embodiments, the connector assembly includes a connector and a connector receiver. The connector includes a first connector end. The connector receiver includes a first gate that moves between a locked and an unlocked position, a longitudinal axis and a pivot axis that is substantially perpendicular to the longitudinal axis. The first gate can further define at least a portion of a connector cavity. The connector cavity can selectively receive the first connector end when the first gate is in the unlocked position. Additionally, the first gate can rotate about the pivot axis when moving between the locked position and the unlocked position.

In various embodiments, the first connector end can have a somewhat spherical configuration including a connector end center. The connector cavity may also have a partially spherical shape including a cavity center. With this configuration, the first connector end can have a diameter that is substantially similar to a diameter of the connector cavity. In some embodiments, the connector end center and the cavity center can be substantially identical when the connector cavity has received the first connector end.

In certain applications, the present invention is further directed toward a connector assembly for a leash system. The connector assembly includes a connector and a connector receiver. The connector includes a first connector end having a somewhat spherical configuration. The connector receiver includes a first gate and a second gate that move between a locked position and an unlocked position, a longitudinal axis and a pivot axis that is substantially perpendicular to the longitudinal axis. The first gate and the second gate can be biased toward the locked position. The first gate and the second gate can further define at least a portion of a connector cavity. The connector cavity can selectively receive the first connector end when the first gate and the second gate are in the unlocked position. The connector cavity can also have a partially spherical shape. With this configuration, the connector cavity can have a diameter that is substantially similar to a diameter of the first connector end. The connector receiver can further include a receiver actuator that is coupled to the first gate and the second gate. The receiver actuator can be configured to move the first gate and the second gate between the locked position and the unlocked position.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Embodiments of the present invention are described herein in the context of a connector assembly for a leash system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
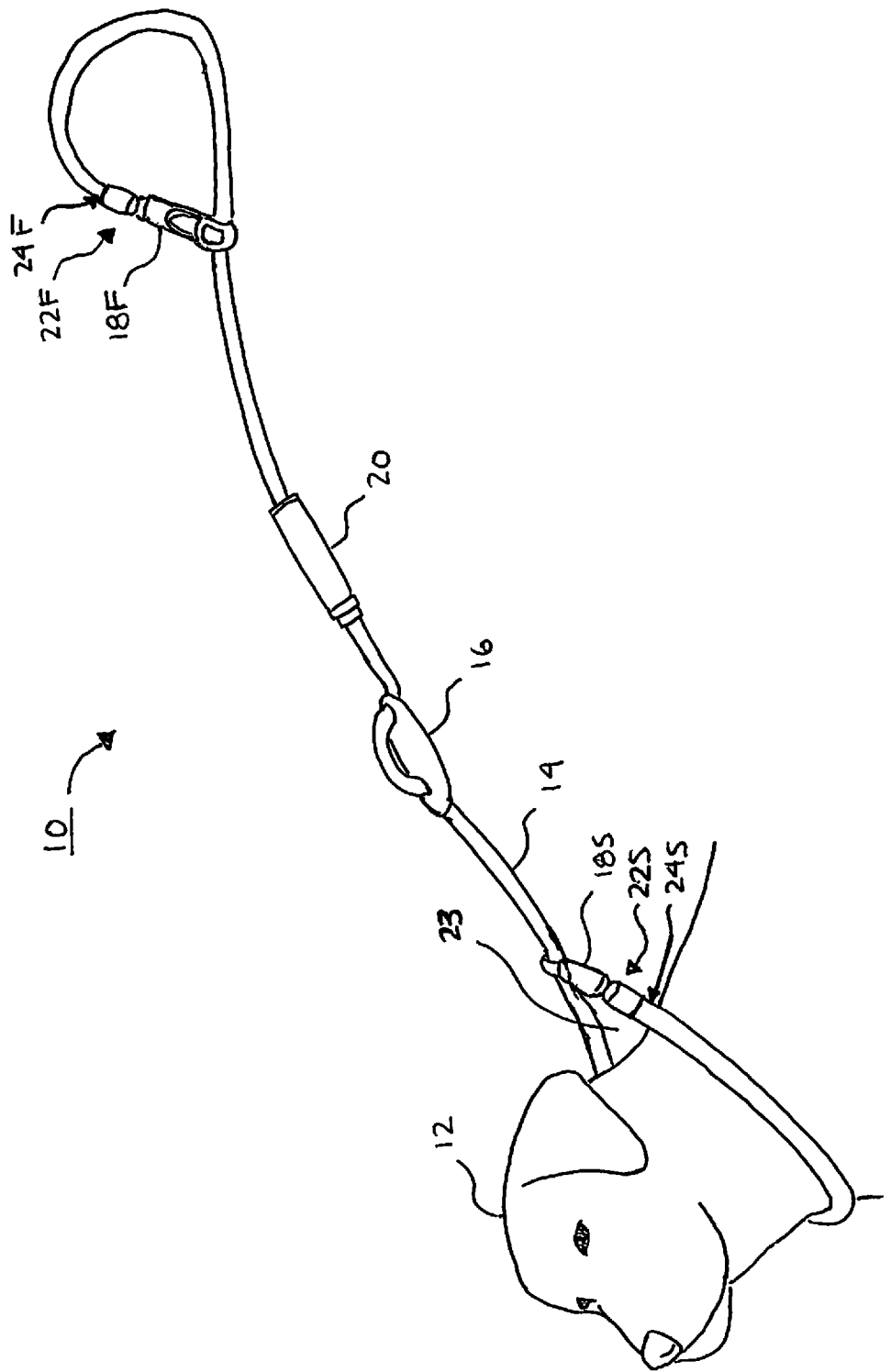
FIG. 1 is a perspective view of a pet and one embodiment of a leash system having features of the present invention.

FIG. 1 is a perspective view of one embodiment of a leash system 10 for use with a dog 12. Although the leash system 10 is specifically described herein with respect to use with dogs 12, it is understood that the leash system 10 can be used with any other animal that may use a leash. It is further understood and appreciated that the leash system 10 and/or its separate structures or components can be used collectively and/or individually in conjunction with other suitable applications which can equally benefit by the teachings provided herein. Thus, the specific reference herein to the leash system 10 for use with dogs 12 is not intended to be limiting in any manner.

The design and/or configuration of the leash system 10 can be varied. In certain embodiments, such as the embodiment illustrated in FIG. 1, the leash system 10 can include a tether 14, a harness attachment 16, one or more latch assemblies 18F, 18S, a handle assembly 20 and one or more connector assemblies 22F, 22S. It is understood that although FIG. 1 illustrates the structures of the leash system 10 in a particular position, sequence and/or order, these structures can be located in any other suitable position, sequence and/or order than that illustrated in FIG. 1. It is also understood that the leash system 10 can include fewer or additional components than those specifically illustrated and described herein.

In various embodiments, the tether 14 can be configured to encircle and/or otherwise be positioned on at least a portion of the dog 12. The tether 14 can also be configured to be coupled and/or connected to various structures or components of the leash system 10. In some embodiments, the tether 14 may also be used in conjunction with the various structures or components of the leash system 10 to form a loop 23 that surrounds at least a portion of the dog 12. Alternatively, the loop 23 may be utilized to encircle or otherwise be positioned on other suitable fixed or movable objects, such as a waist or other body parts of the user, or around poles, trees, etc., or to create a handle.

The tether 14 can vary to suit the design requirements of the leash system 10. As non-exclusive examples, the tether 14 can include a rope, a cord, a cable or a chain. Alternatively, the tether 14 can include any other suitable type or style. In addition, the tether 14 may be formed from any suitable synthetic or natural material, such as nylon, rubber, cotton, leather, metal, etc., which may be in a solid or a braided form. The resistance of the tether 14 can also vary depending on the design requirements of the leash system 10. For example, in some embodiments, the tether 14 can be flexible, resilient and/or elastic. In other embodiments, the tether 14 can be inflexible and/or rigid. Additionally, and/or alternatively, the tether 14 can include a diameter, a length and/or a width that is variable.

In the embodiment illustrated in FIG. 1, the tether 14 can include a first tether end 24F and a second tether end 24S. It is recognized that the terms "first tether end 24F" and "second tether end 24S" can be used interchangeably. The first tether end 24F and the second tether end 24S can include the tip or end of the tether 14.

The harness attachment 16 is configured to allow the tether 14 to encircle and/or tighten around a snout or muzzle of the dog 12. With this configuration, the harness attachment 16 can allow the tether 14 to form a snout harness (not shown) by encircling and/or tightening around the snout or muzzle of the dog 12, while still allowing the user sufficient control to restrain the dog 12 with the tether 14. The design of the harness attachment 16 can vary. For example, the harness attachment 16 can be of any suitable shape or design. Additionally, the harness attachment 16 can be made from any suitable material, such as a plastic or a metal, as non-exclusive examples.

In the embodiment in FIG. 1, the leash system 10 includes a first latch assembly 18F and a second latch assembly 18S. However, it is understood that the leash system 10 can include any number of latch assemblies 18F, 18S, i.e., one latch assembly, two latch assemblies, etc. The latch assemblies 18F, 18S, can be configured to latch or clasp to the tether 14, other suitable structures or components of the leash system 10 and/or any other suitable accessory, such as a ring of a dog collar (not shown), a harness (not shown), a pinch collar (not shown), or a halter (not shown), as non-exclusive examples.

The design of the latch assemblies 18F, 18S, can be varied to suit the design requirements of the leash system 10. In the embodiment illustrated in FIG. 1, the first latch assembly 18F is coupled to the tether 14 at the first tether end 24F via a first connector assembly 22F and the second latch assembly 18S is coupled to the tether 14 at the second tether end 24S via a second connector assembly 22S. In other embodiments, the latch assemblies 18F, 18S, can be connected directly to the tether 14. The latch assemblies 18F, 18S, can be coupled and/or connected to the tether 14 via any suitable manner or method.

The handle assembly 20 is configured to be coupled to, connected to and/or engaged with the tether 14 in order to hold or grip the tether 14 and allow the user to sufficiently control movement of the dog 12. The design of the handle assembly 20 can vary. As one non-exclusive example, the embodiment illustrated in FIG. 1 shows the handle assembly 20 having a somewhat cylindrical shape or configuration. As an alternative example, the handle assembly 20 can have a somewhat spherical shape or configuration, or any other suitable configuration or geometry.

With these designs, the handle assembly 20 can be configured to allow the tether 14 to pass through an interior (not shown) of the handle assembly 20, with the handle assembly 20 encircling and/or engaging at least a portion of the tether 14. Furthermore, the handle assembly 20 can be configured to slide or move on the tether 14 to various locations between the first tether end 24F and the second tether end 24S. The handle assembly 20 can also be configured to engage or lock onto the tether 14 at various locations between the first tether end 24F and the second tether end 24S. In other embodiments, the handle assembly 20 can be configured to be alternately coupled or connected to the tether ends 24F, 24S.

In the embodiment in FIG. 1, the leash system 10 includes a first connector assembly 22F and a second connector assembly 22S. However, it is understood that the leash system 10 can include any number of connector assemblies 22F, 22S, i.e., one connector assembly, two connector assemblies, etc. The connector assemblies 22F, 22S, can be configured to allow a variety of customizable leash attachments, accessories and/or structures or components of the leash system 10, which may include the latch assemblies 18F, 18S, or the handle assembly 20, to be coupled and/or connected to the leash system 10.

The design of the connector assemblies 22F, 22S, can be varied to suit the design requirements of the leash system 10. In the embodiment illustrated in FIG. 1, at least a portion of the first connector assembly 22F is connected to the first tether end 24F and at least a portion of the second connector assembly 22S is connected to the second tether end 24S. The connector assemblies 22F, 22S, can be connected to the first tether end 24F and the second tether end 24S via any suitable manner or method. Further, at least a portion of the first connector assembly 22F is connected to a portion of the first latch assembly 18F and at least a portion of the second connector assembly 22S is connected to a portion of the second latch assembly 18S. The first connector assembly 22F can be connected to the first latch assembly 18F via any suitable manner or method. The second connector assembly 22S can also be connected to the second latch assembly 18S via any suitable manner or method. Additionally, and/or alternatively, the connector assemblies 22F, 22S, can be coupled or connected to any other suitable structures or components of the leash system 10. The specific components of the connector assemblies 22F, 22S, will be described in greater detail herein below in relation to the embodiments illustrated in FIGS. 2A-2C.

Figure 2A:
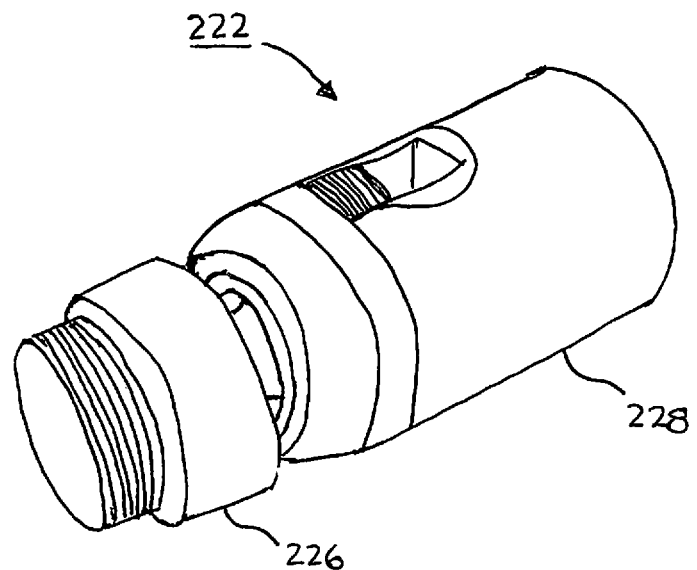
FIG. 2A is a perspective view of an embodiment of a connector assembly of the leash system.

FIG. 2A is a perspective view of an embodiment of the connector assembly 222. In the embodiment illustrated in FIG. 2A, the connector assembly 222 includes a connector 226 and a connector receiver 228. The connector 226 can be configured to be inserted into and/or to become engaged with the connector receiver 228. The connector receiver 228 can be configured to receive and/or to become engaged with the connector 226. It is further recognized that the connector assembly 222 can include fewer or additional components than those specifically illustrated and described herein.

It is understood that the connector receiver 228 can move between a locked position and an unlocked position. As used herein, in some embodiments, while the connector receiver 228 is in the "locked position" the connector 226 cannot be inserted into and/or become engaged with the connector receiver 228. In other words, in the locked position, the connector receiver 228 cannot receive the connector 226. In other embodiments, the connector 226 cannot be separated and/or disengaged from the connector receiver 228 when the connector receiver 228 is in the locked position. In certain embodiments, the connector receiver 228 is biased towards the locked position.

Contrarily, when the connector receiver is in the "unlocked position" the connector 226 can be inserted into and/or become engaged with the connector receiver 228. Stated another way, the connector receiver 228 can receive the connector 226. Furthermore, the connector 226 can be separated and/or disengaged from the connector receiver 228 when the connector receiver 228 is in the unlocked position. While the configuration of the connector receiver 228 can move between the locked and the unlocked positions, the configuration of the connector 226 does not change.

Although it is referred to herein that the connector receiver 228 can move between the locked position and the unlocked position, it is recognized that various components or structures of the connector receiver 228 can also move between the locked position and the unlocked position.

Figure 2B:
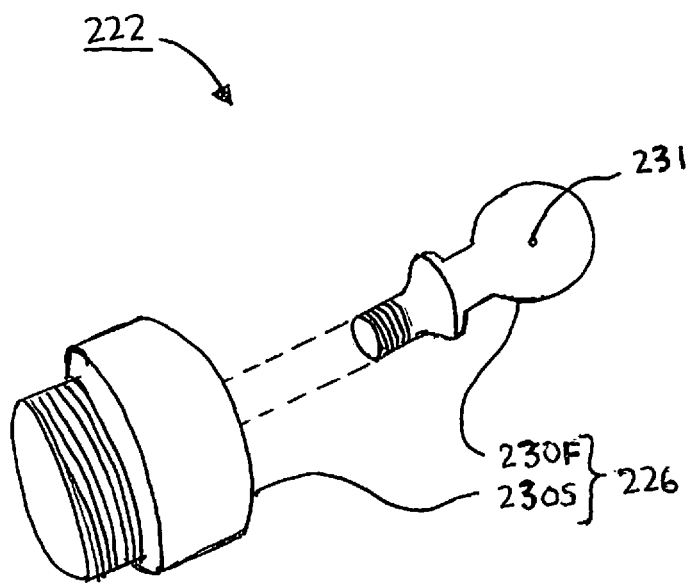
FIG. 2B is an exploded view of a connector of the connector assembly in FIG. 2A.

FIG. 2B is an exploded view of the connector 226 of the connector assembly 222 in FIG. 2A. In this embodiment, at least a portion of the connector 226 can be configured to insert into or otherwise engage with the connector receiver 228 (illustrated in FIG. 2A). At least a portion of the connector 226 can also be configured to attach to various other structures or components of the leash system 10, such as the tether 14 (illustrated in FIG. 1), the latch assemblies 18F, 18S (illustrated in FIG. 1) or the handle assembly 20 (illustrated in FIG. 1), as non-exclusive examples. The design of the connector 226 can vary. In the embodiment illustrated in FIG. 2B, the connector 226 can include a first connector end 230F and a second connector end 230S. It is recognized that the terms "first connector end 230F" and "second connector end 230S" can be used interchangeably. While illustrated as two separate components, in certain embodiments, the first connector end 230F and the second connector end 230S can be formed as a unitary structure.

The first connector end 230F can be configured to insert into and/or otherwise engage with the connector receiver 228. The first connector end 230F can insert into and/or otherwise engage with the connector receiver 228 via any suitable manner or method. In this embodiment, the first connector end 230F can include a somewhat spherical shape or configuration. As referred to herein, "somewhat spherical" can include any suitable rounded or curved configuration. With this configuration, the first connector end 230F can include a connector end center 231, which includes the center of the substantially spherical first connector end 230F. Alternatively, the first connector end 230F can include any other suitable configuration or geometry.

The second connector end 230S can be configured to attach to various structures or components of the leash system 10. In this embodiment, at least a portion of the second connector end 230S can include a thread or helical structure that allows the second connector end 230S to connect or attach to the various structures or components of the leash system 10. Alternatively, the second connector end 230S can have any other suitable design and/or can connect or attach to the various structures or components of the leash system 10 via any suitable manner or method. Additionally, and/or in the alternative, at least a portion of the second connector end 230S can include a concave and/or somewhat semi-spherical shape or configuration, or any other suitable configuration or geometry.

Figure 2C:
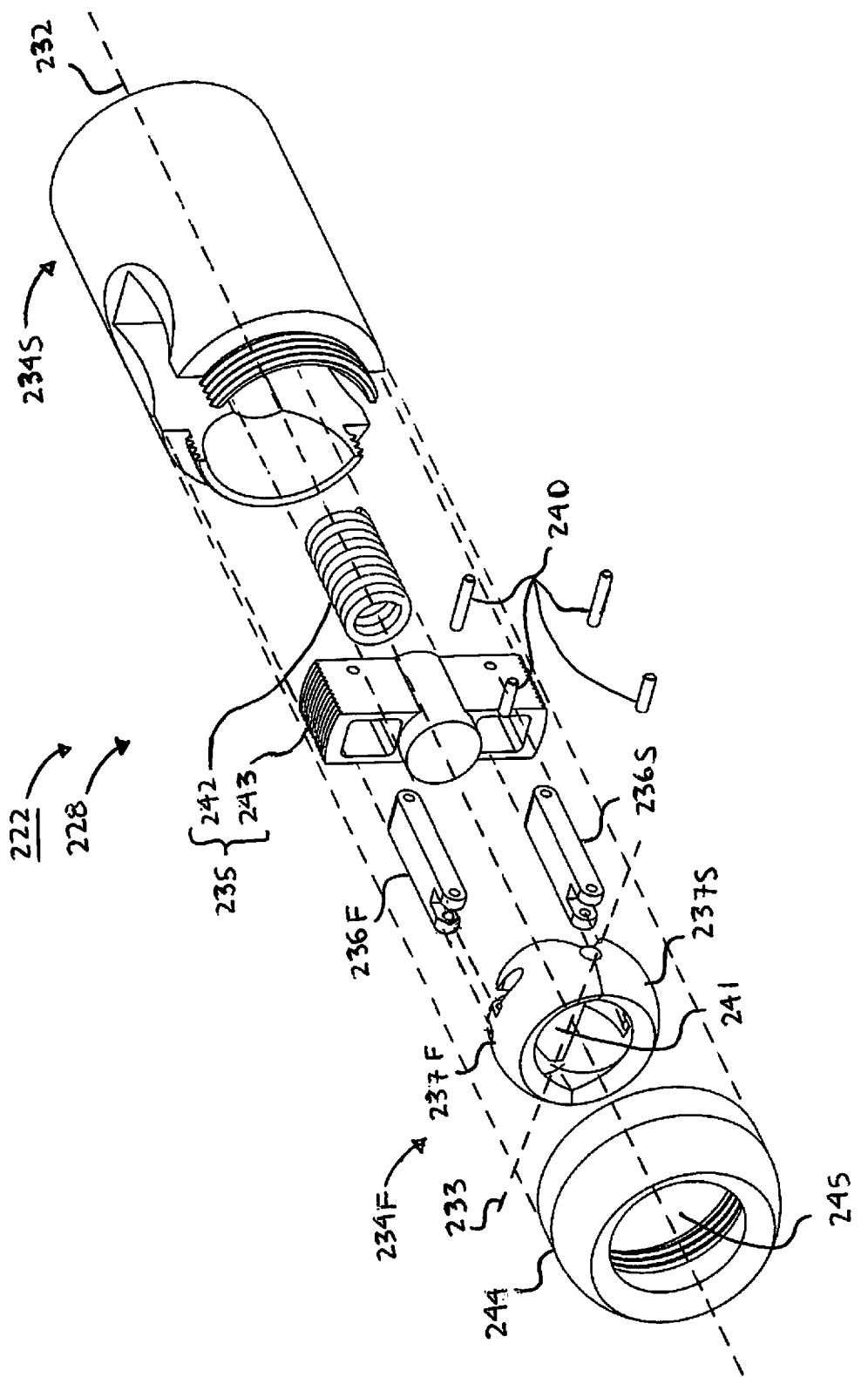
FIG. 2C is an exploded view of a connector receiver of the connector assembly in FIG. 2A.

FIG. 2C is an exploded view of the connector receiver 228 of the connector assembly 222 in FIG. 2A. In this embodiment, at least a portion of the connector receiver 228 can be configured to receive and/or otherwise engage with at least a portion of the connector 226 (illustrated in FIGS. 2A and 2B), i.e., the first connector end 230F (illustrated in FIG. 2B). In other words, the connector receiver 228 can receive and/or otherwise engage with the first connector end 230F by encircling or engaging at least a portion of the first connector end 230F. At least a portion of the connector receiver 228 can also be configured to attach to various structures or components of the leash system 10 (illustrated in FIG. 1), such as the tether 14 (illustrated in FIG. 1), the latch assemblies 18F, 18S (illustrated in FIG. 1) or the handle assembly 20 (illustrated in FIG. 1), as non-exclusive examples.

The design of the connector receiver 228 can vary depending on the design requirements of the leash system 10. In the embodiment illustrated in FIG. 2C, the connector receiver 228 includes a longitudinal axis 232 and a pivot axis 233. Further, in this embodiment, the connector receiver 228 can include a first receiver end 234F, a second receiver end 234S and a receiver assembly 235. It is recognized that the terms "first receiver end 234F" and "second receiver end 234S" can be used interchangeably. It is also recognized that the connector receiver 228 can include fewer or additional components than those specifically illustrated and described herein.

The first receiver end 234F can be configured to receive and/or otherwise engage with the first connector end 230F. The first receiver end 234F can receive and/or otherwise engage to the first connector end 230F via any suitable manner or method. The design of the first receiver end 234F can also vary to include various components. In some embodiments, the first receiver end 234F can include a first gate attachment member 236F and a first gate 237F. In the embodiment illustrated in FIG. 2C, the first receiver end 234F includes a first gate attachment member 236F, a second gate attachment member 236S, a first gate 237F and a second gate 237S. It is recognized that the terms "first gate attachment member 236F" and "second gate attachment member 236S" can be used interchangeably. Also, the terms "first gate 237F" and "second gate 237S" can be used interchangeably. While the first receiver end 234F is described herein as including two gate attachment members, 236F, 236S and two gates 237F, 237S, it is understood that the first receiver end 234F can include any number of gate attachment members 236F, 236S and/or gates 237F, 237S, i.e., including one, two, etc.

The first gate attachment member 236F and the second gate attachment member 236S are positioned within an interior of the connector receiver 228. The design and/or length of the first gate attachment member 236F and the second gate attachment member 236S can be varied. In certain embodiments, the first gate attachment member 236F can extend from a portion of the receiver assembly 235 to the first gate 237F and the second gate attachment member 236S can extend from a portion of the receiver assembly 235 to the second gate 237S. The first gate attachment member 236F and the second gate attachment member 236S can be coupled or connected to a portion of the receiver assembly 235, the first gate 237F and/or the second gate 237S via any suitable manner or method. As one non-exclusive example, in the embodiment illustrated in FIG. 2C, the first gate attachment member 236F and the second gate attachment member 236S are coupled to a portion of the receiver assembly 235, the first gate 237F and/or the second gate 237S with one or more pins 240. The pins 240 are inserted into at least a portion of the receiver assembly 235, the first gate 237F and/or the second gate 237S. The pins 240 can be of any suitable design and/or length.

The first gate 237F and the second gate 237S can be configured to encircle or otherwise engage at least a portion of the first connector end 230F. The design of the first gate 237F and the second gate 237S can be varied depending on the design requirements of the leash system 10. In the embodiment illustrated in FIG. 2C, the first gate 237F and the second gate 237S are coupled. The first gate 237F and the second gate 237S can be coupled via any suitable manner or method. Furthermore, in this embodiment, the first gate 237F and the second gate 237S have a somewhat spherical configuration. With this configuration, the first gate 237F and the second gate 237S can form at least a portion of a connector cavity 241 that also has a partially spherical shape or configuration, i.e., forming at least a portion of a sphere. The connector cavity 241 can be configured to receive the first connector end 230F. The diameter of the first connector end 230F can be substantially similar to the diameter of the connector cavity 241. In other words, the diameter of the first connector end 230F can be substantially equal to or the same as the diameter of the connector cavity 241. Accordingly, the diameter of the connector cavity 241 and the diameter of the first connector end 230F may deviate by approximately 1 mm, 2 mm, 3 mm, etc., for example, and remain "substantially" similar or the same. Use of the term "substantially" is intended, therefore, to allow for moderate deviations. Alternatively, the size, shape and/or design of the connector cavity 241 can vary depending on the design and/or shape of the first connector end 230F, or vice versa. As such, the connector cavity 241 can include any other dimension substantially similar to the first connector end 230F.

Additionally, in certain embodiments, the first gate 237F and the second gate 237S can rotate about the pivot axis 233. As referred to herein, in one embodiment, the pivot axis 233 is substantially perpendicular to the longitudinal axis 232 of the connector receiver 228. The first gate 237F and the second gate 237S can rotate about the pivot axis 233 in any suitable manner. In one embodiment, the first gate 237F can be coupled to the second gate 237S at the pivot axis 233.

The receiver assembly 235 is coupled to the connector receiver 228 and allows the connector receiver 228 to move between the locked and unlocked positions. The receiver assembly 235 can be coupled to the connector receiver 228 via any suitable manner or method. The design of the receiver assembly 235 can also vary. In this embodiment, the receiver assembly 235 can include a spring 242 and a receiver actuator 243. It is recognized that the receiver assembly 235 can include fewer or additional components than those specifically illustrated and described herein.

The spring 242 is positioned within the interior of the connector receiver 228. More specifically, the spring 242 can be positioned between the first receiver end 234F and the second receiver end 234S. In the embodiment illustrated in FIG. 2C, the spring 242 may be partially positioned within a portion of the receiver actuator 243. Furthermore, the spring 242 can engage at least a portion of the receiver actuator 243 and/or the connector receiver 228, which can cause the spring 242 to compress.

The receiver actuator 243 can have any suitable design. Accordingly, the receiver actuator 243 can be manipulated, i.e., moved, depressed, slid, etc., in order to move the connector receiver 228, including the first gate 237F and the second gate 237S, between the locked and unlocked positions. For example, in one such embodiment, the receiver actuator 243 can include a switch, wherein the receiver actuator 243 can be selectively moved to discrete positions within a slot to move the connector receiver 228 between the locked and unlocked positions. Similarly, the receiver actuator 243 can include a lever that can be selectively moved to discrete positions within the slot to move the connector receiver 228 between the locked and unlocked positions. Alternatively, the receiver actuator 243 can include a button that is coupled to the connector receiver 228. In such embodiment, depressing the button can move the connector receiver 228 between the locked and unlocked positions. Still alternatively, the receiver actuator 243 can include a slidable element, wherein the receiver actuator 243 can be selectively slid to discrete positions within the slot to move the connector receiver 228 between the locked and unlocked positions.

In some embodiments, the first receiver end 234F can also include a receiver cap 244 that can encase at least a portion of the structures or components of the connector receiver 228, including the first gate attachment member 236F, the second gate attachment member 236S, the first gate 237F, the second gate 237S, etc. The design of the receiver cap 244 can vary. In this embodiment, the receiver cap 244 can include a somewhat semi-spherical shape or configuration. In other embodiments, the receiver cap 244 can include any other suitable configuration or geometry. For example, in one embodiment, receiver cap 244 can have the somewhat semi-spherical shape or configuration and the second connector end 230S (illustrated in FIGS. 2A and 2B) can include an opposing concave semi-spherical shape or configuration, which can allow rotational movement when the first connector end 230F is engaged with at least a portion of the first receiver end 234F.

While encasing the structures or components of the connector receiver 228, the receiver cap 244 may still allow for the first connector end 230F to be inserted into and/or otherwise engaged with the first receiver end 234F. Accordingly, the receiver cap 244 can include a cap opening 245 with a diameter or other dimension that is substantially similar to or greater than the diameter or other dimension of the first connector end 230F.

The receiver cap 244 can connect or attach to the first receiver end 234F. The receiver cap 244 can attach to the first receiver end 234F via any suitable manner or method. In this embodiment, a portion of the receiver cap 244 can include a thread or helical structure that allows the receiver cap 244 to attach to the first receiver end 234F. In such embodiment, at least a portion of the first receiver end 234F may also include the thread or helical structure.

The second receiver end 234S can be configured to connect or attach to various structures or components of the leash system 10. For example, in one embodiment the second receiver end 234S can include a thread or helical structure that allows the second receiver end 234S to connect or attach to the various structures or components of the leash system 10. Alternatively, the second receiver end 234S can include any other suitable design and/or can connect or attach to the various structures or components of the leash system 10 via any suitable manner or method.

Figure 3A:
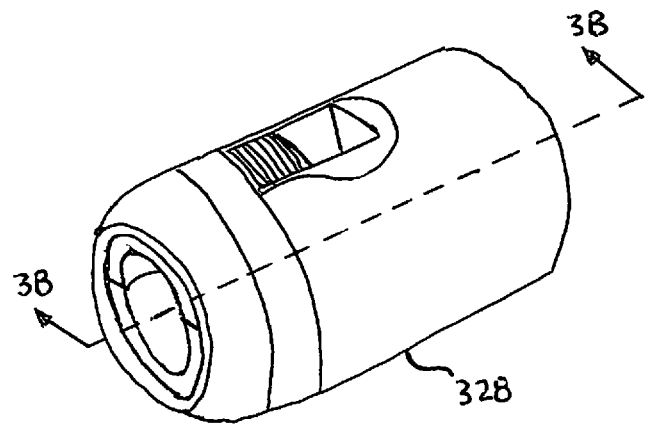
FIG. 3A is a perspective view of an embodiment of the connector receiver, shown in a locked position.

FIG. 3A is a perspective view of an embodiment of the connector receiver 328 in the locked position. In the embodiment illustrated in FIG. 3A, the connector 226 (illustrated in FIGS. 2A and 2B) has been omitted.

Figure 3B:
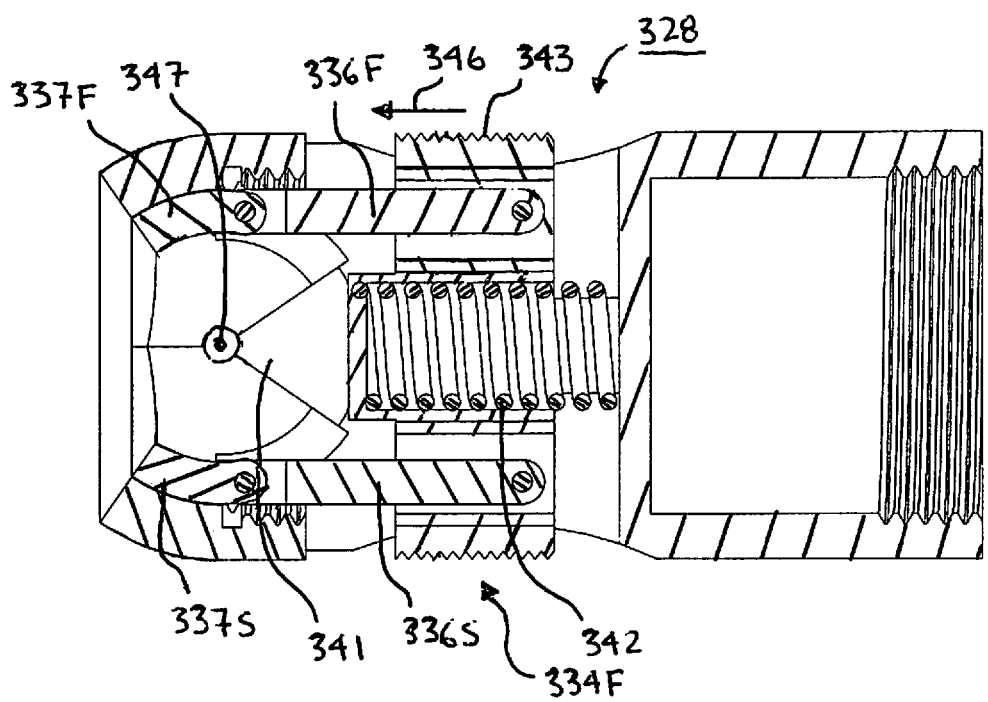
FIG. 3B is a cross-sectional view of the connector receiver taken on line 3B-3B in FIG. 3A.

FIG. 3B is a cross-sectional view of the connector receiver 328 taken on line 3B-3B in FIG. 3A. FIG. 3B shows the connector receiver 328 in the locked position. In various embodiments, such as the embodiment illustrated in FIG. 3B, the connector receiver 328 is biased toward the locked position. In other words, the spring 342 is biased to maintain the connector receiver 328 in the locked position when the spring 342 is resting. In this embodiment, the receiver actuator 343 can also be biased in a first direction of arrow 346, which can selectively maintain the first gate 337F and the second gate 337S in the locked position. More specifically, the first gate 337F can be coupled to the receiver actuator 343 via the first gate attachment member 336F and the second gate 337S can be coupled to the receiver actuator 343 via the second gate attachment member 336S. Accordingly, in certain embodiments, the first gate 337F and the second gate 337S can be biased toward the locked position as the spring 342 is resting.

For example, in the embodiment in FIG. 3B, the spring 342 is at least partially positioned within a portion of the receiver actuator 343, with the spring 342 engaging at least a portion of the receiver actuator 343. When the spring 342 is resting, the first gate attachment member 336F and the second gate attachment member 336S are biased towards the second connector end 230S (illustrated in FIG. 2B) in the first direction of arrow 346. Accordingly, the first gate 337F and the second gate 337S are also biased in the direction of arrow 346, such that the first gate 337F and the second gate 337S extend passed the connector end center 231 (illustrated in FIG. 2B) in a direction toward the second connector end 230S to inhibit the first connector end 230F (illustrated in FIG. 2B) from separating from the connector cavity 341 or disengaging from a portion of the first receiver end 334F.

Additionally, in FIG. 3B, the connector cavity 341 has least a partially spherical shape or configuration. With this configuration, the connector cavity 341 can include a cavity center 347, which includes the center of the at least partially spherical connector cavity 341.

Figure 4A:
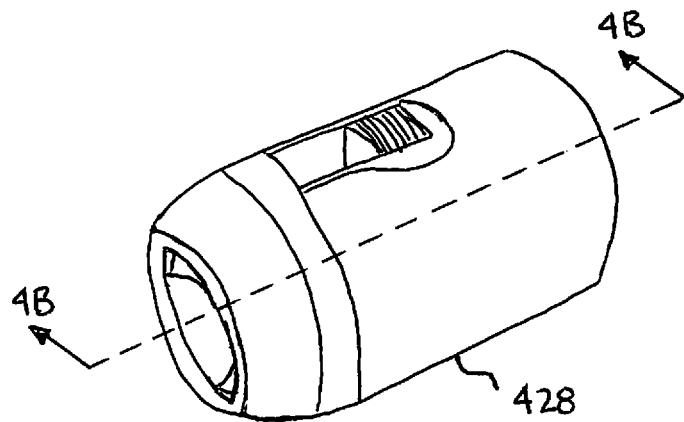
FIG. 4A is a perspective view of an embodiment of the connector receiver, shown in an unlocked position.

FIG. 4A is a perspective view of an embodiment of the connector receiver 428 in the unlocked position. In the embodiment illustrated in FIG. 4A, the connector 226 (illustrated in FIGS. 2A and 2B) has been omitted.

Figure 4B:
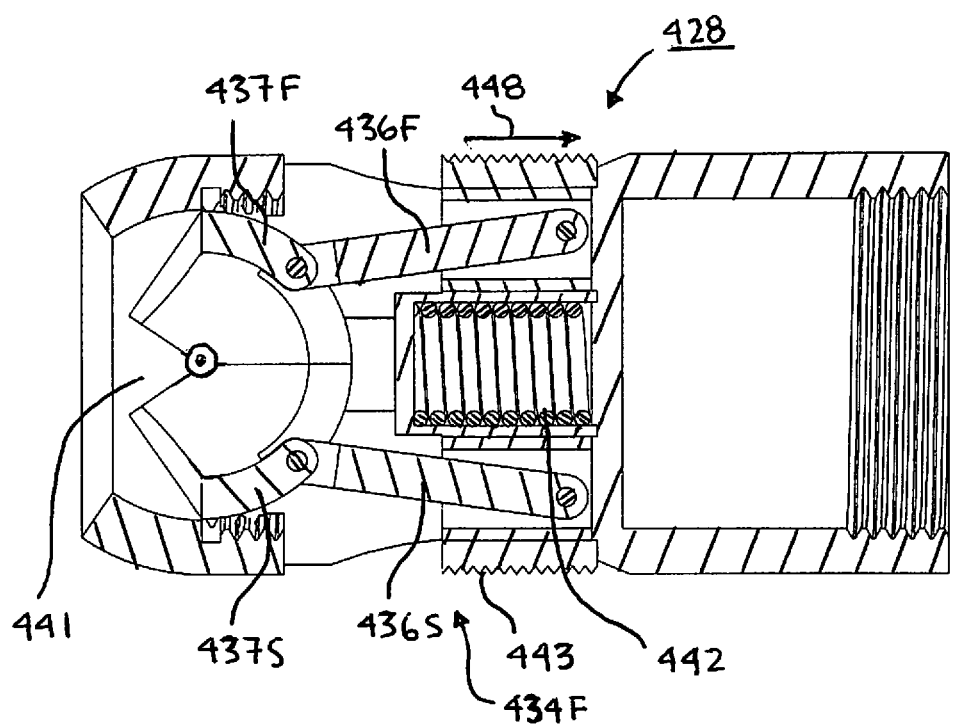
FIG. 4B is a cross-sectional view of the connector receiver taken on line 4B-4B in FIG. 4A.

FIG. 4B is a cross-sectional view of the connector receiver 428 taken on line 4B-4B in FIG. 4A. The embodiment illustrated in FIG. 4B shows the connector receiver 428 in the unlocked position. In this embodiment, the first gate 437F can be coupled to the receiver actuator 443 via the first gate attachment member 436F and the second gate 437S can be coupled to the receiver actuator 443 via the second gate attachment member 436S. Accordingly, in certain embodiments, the first gate 437F and the second gate 437S can be configured to move between the locked position and the unlocked position. In this embodiment, the first gate 437F and the second gate 437S can be configured to move to the unlocked position as the receiver actuator 443 is manipulated. The connector receiver 428, including the first gate 437F and the second gate 437S, can then return to the locked position when the receiver actuator 443 is not being manipulated. In other words, in various embodiments, the connector receiver 428, including the first gate 437F and the second gate 437S, remains in the locked position unless the receiver actuator 443 is manipulated.

For example, in the embodiment in FIG. 4B, the spring 442 is at least partially positioned within a portion of the receiver actuator 443, with the spring 442 engaging at least a portion of the receiver actuator 443 and/or the connector receiver 428. When the receiver actuator 443 is manipulated, i.e., moved in a second direction of arrow 448, which is opposite the first direction of arrow 346 (illustrated in FIG. 3B), the spring 442 is compressed. As the receiver actuator 443 is manipulated to compress the spring 442, the first gate attachment member 436F and the second gate attachment member 436S can move in the second direction of arrow 448. Movement of the first gate attachment member 436F and the second gate attachment member 436S in the second direction of arrow 448 can simultaneously cause the first gate 437F and the second gate 437S to rotate from the locked position to the unlocked position. In other words, movement of the first gate attachment member 436F and the second gate attachment member 436S can simultaneously cause the first gate 437F and the second gate 437S to rotate relative to the pivot axis 233 (illustrated in FIG. 2C) in substantially the same second direction of arrow 448 in order to move the first gate 437F and the second gate 437S between the locked position and the unlocked position.

When in the unlocked position, the first connector end 230F (illustrated in FIGS. 2A and 2B) can be inserted into and/or become engaged with at least a portion of the first receiver end 434F. In other words, the connector cavity 441 can receive the first connector end 230F. Furthermore, the first connector end 230F can be separated from the connector cavity 441 and/or disengaged from a portion of the first receiver end 434F. Accordingly, the unlocked position can further include a position of the connector receiver 428 wherein the first gate 437F and/or the second gate 437S are configured to allow the first connector end 230F to engage and/or disengage from at least a portion of the first receiver end 434F and/or to allow the connector cavity 441 to receive the first connector end 230F.

Figure 5A:
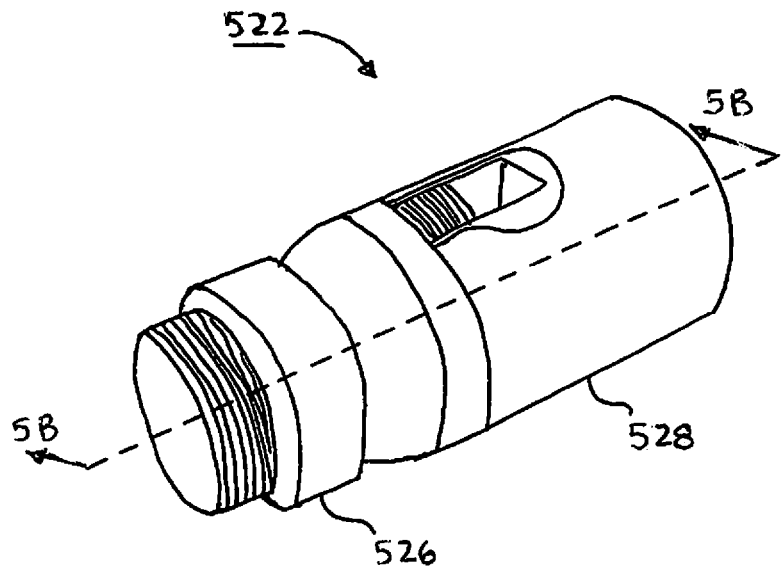
FIG. 5A is a perspective view of the connector assembly, including the connector receiver shown in the locked position.

FIG. 5A is a perspective view of another embodiment of the connector assembly 522. In the embodiment illustrated in FIG. 5A, the connector assembly 522 includes the connector 526 and the connector receiver 528. In this embodiment, the connector receiver 528 is shown in the locked position.

Figure 5B:
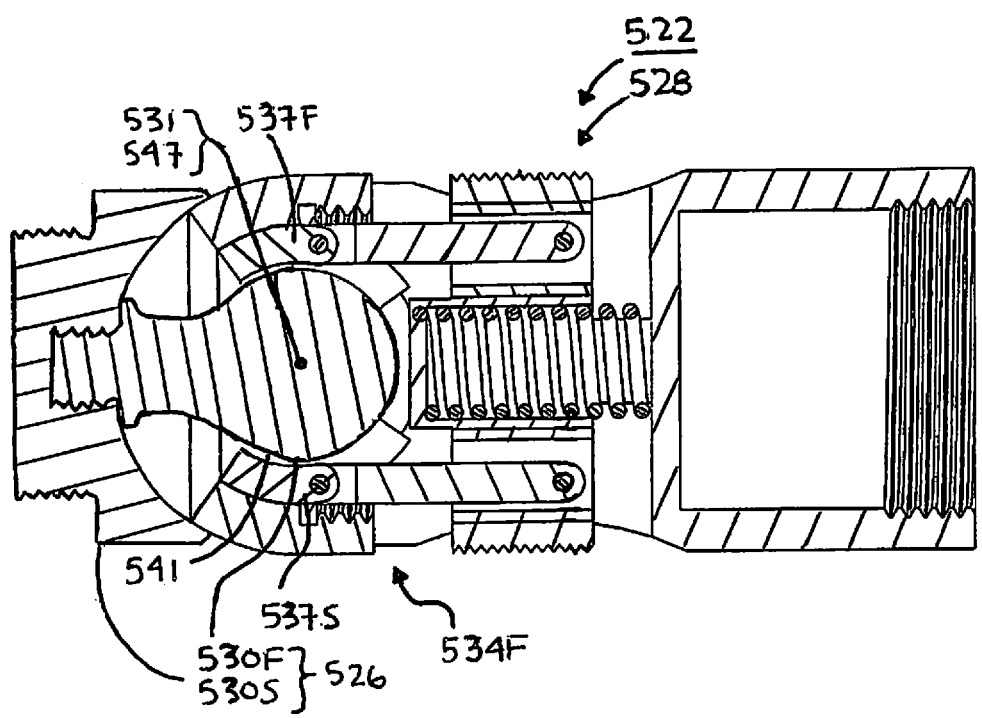
FIG. 5B is a cross-sectional view of the connector assembly taken on line 5B-5B in FIG. 5A.

FIG. 5B is a cross-sectional view of the connector assembly 522 taken on line 5B-5B in FIG. 5A. The embodiment illustrated in FIG. 5B shows the connector receiver 528 in the locked position. In FIG. 5B, the connector 526 is engaged with the connector receiver 528. More particularly, the connector cavity 541 has received the first connector end 530F. Stated another way, the first connector end 530F has been inserted into the connector cavity 541 and/or otherwise engaged with a portion of the first receiver end 534F. Both the first connector end 530F and the connector cavity 541 have the somewhat and/or at least partially spherical shape or configuration. Further, the diameter of the first connector end 530F is substantially similar to the diameter of the connector cavity 541. In other words, the diameter of the first connector end 530F can be substantially equal to or the same as the diameter of the connector cavity 541. Accordingly, the connector end center 531 and the cavity center 547 can be substantially similar or identical. With this configuration, the first connector end 530F can rotate when it is engaged with at least a portion of the first receiver end 534F. In various embodiments, the first connector end 530F can rotate in nearly any direction.

As shown in FIG. 5B, when in the locked position, the first gate 537F and the second gate 537S can encircle or otherwise engage with a portion of the first connector end 530F. As used herein in reference to the locked position, "portion" refers to any portion of the first connector end 530F wherein the first gate 537F and the second gate 537S extend passed the connector end center 531 in a direction toward the second connector end 530S of the connector 526 to inhibit the first connector end 530F from separating from the connector cavity 541 or disengaging from a portion of the first receiver end 534F. Again, with this configuration, the first gate 537F and the second gate 537S can engage or contact at least a portion of the first connector end 530F, which can provide a more secure and reliable connection.

Figure 6A:
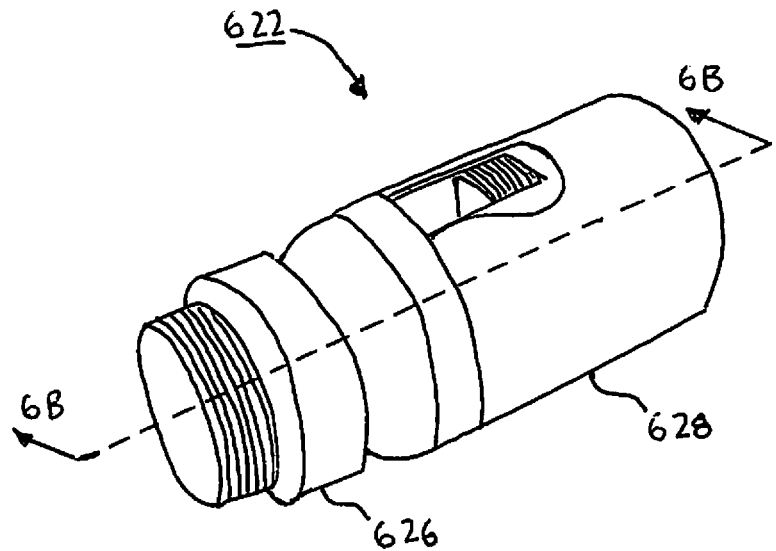
FIG. 6A is a perspective view of the connector assembly, including the connector receiver shown in the unlocked position.

FIG. 6A is a perspective view of another embodiment of the connector assembly 622. In the embodiment illustrated in FIG. 6A, the connector assembly 622 includes the connector 626 and the connector receiver 628. However, in this embodiment, the connector receiver 628 is shown in the unlocked position.

Figure 6B:
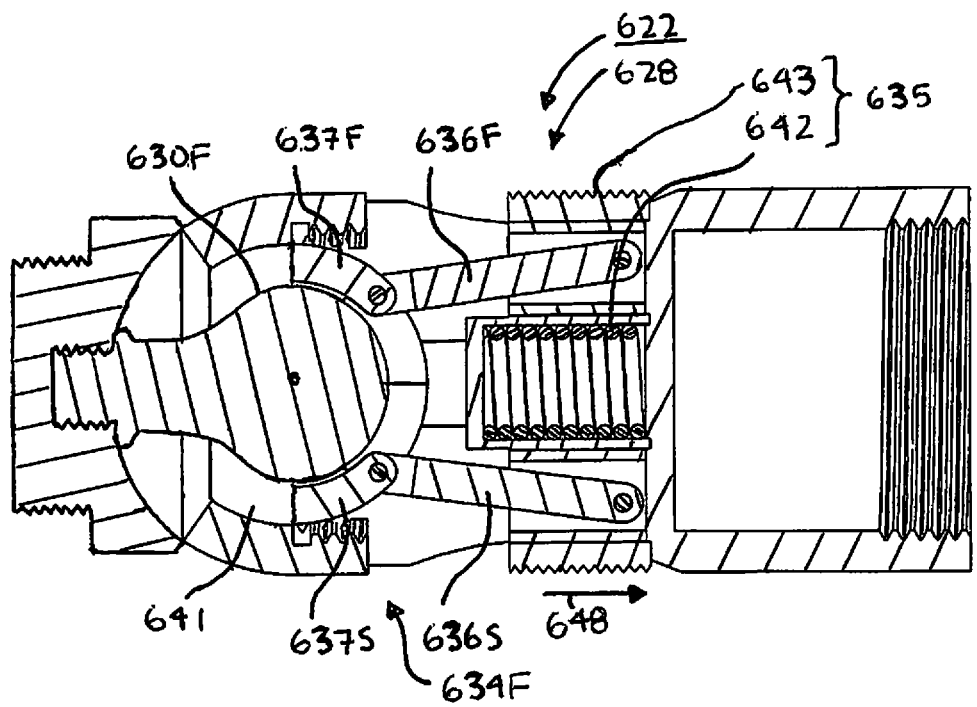
FIG. 6B is a cross-sectional view of the connector assembly taken on line 6B-6B in FIG. 6A.

FIG. 6B is a cross-sectional view of the connector assembly 622 taken on line 6B-6B in FIG. 6A. The embodiment illustrated in FIG. 6B shows the connector receiver 628 in the unlocked position. When in the unlocked position, the first connector end 630F can be inserted into and/or become engaged with at least a portion of the first receiver end 634F. In other words, the connector cavity 641 can receive the first connector end 630F. Furthermore, the first connector end 630F can be separated from the connector cavity 641 and/or disengaged from a portion of the first receiver end 634F. Accordingly, the unlocked position can further include a position of the connector receiver 628 wherein the first gate 637F and the second gate 637S are configured to allow the first connector end 630F to engage and/or disengage from at least a portion of the first connector end 634F and/or to allow the connector cavity 641 to receive the first connector end 630F.

Additionally, in some embodiments, the receiver assembly 635 can be configured to allow insertion of the first connector end 630F into the connector cavity 641 absent manual movement of the receiver actuator 643. As used herein, the term "manual" can include the user using his or her hand(s) to control at least a portion of the leash system 10. For example, in the embodiment in FIG. 6B, the spring 642 is at least partially positioned within a portion of the receiver actuator 643, with the spring 642 engaging at least a portion of the receiver actuator 643 and/or the connector receiver 628. In this embodiment, the first gate attachment member 636F is coupled to the receiver actuator 643 and the first gate 637F and the second gate attachment member 637S is coupled to the receiver actuator 643 and the second gate 637S, such that inserting the first connector end 630F can cause the spring 642 to compress to overcome the bias, which may then cause the first gate 637F and the second gate 637S to rotate to the unlocked position.

More particularly, in FIG. 6B, the first connector end 630F can engage and/or contact a portion of the first gate 637F and the second gate 637S as the first connector end 630F is being inserted into the connector cavity 641 and/or engaged with at least a portion of the first receiver end 634F, causing the spring 642 to compress. Compression of the spring 642 can allow the first gate attachment member 636F and the second gate attachment member 636S to move in the direction of arrow 648, which simultaneously can cause the first gate 637F and the second gate 637S to rotate to the unlocked position. In other words, the first gate 637F and the second gate 637S can rotate relative to the pivot axis 233 (illustrated in FIG. 2C) in substantially the same direction of arrow 648. With the configuration described above, the connector cavity 641 can receive the first connector end 630F without any manual movement of the release actuator 643. Additionally, the bias of the spring 642 can be overcome without movement of the release actuator 643.

Figure 7:
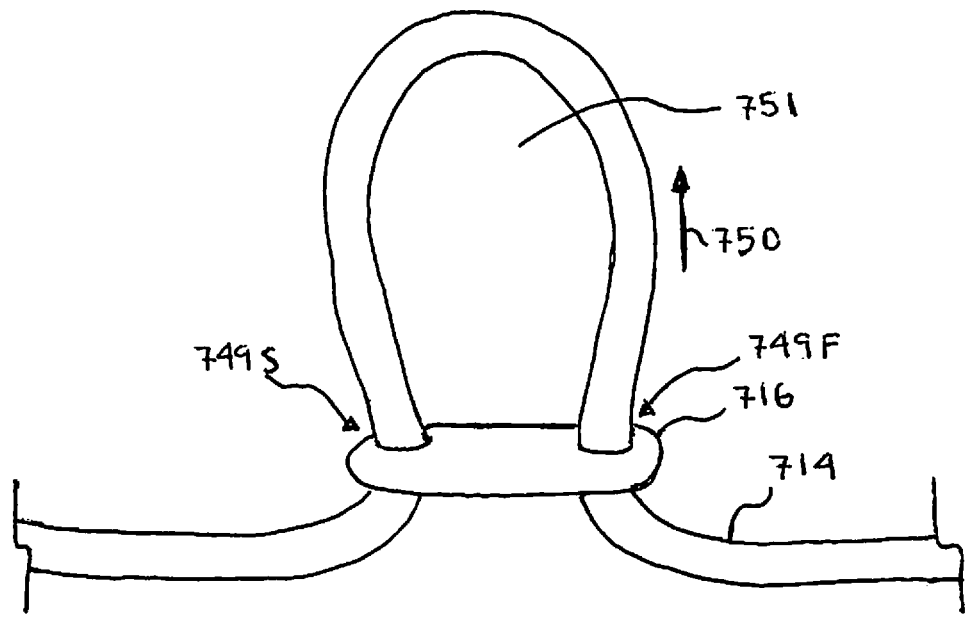
FIG. 7 is a perspective view of one embodiment of a harness attachment of the leash system.

FIG. 7 is a perspective view of one embodiment of the harness attachment 716. The harness attachment 716 can allow the tether 714 to serve as a snout harness (not shown). In other words, the harness attachment 716 is configured to allow the tether 714 to encircle and/or tighten around the snout or muzzle of the dog 12 (illustrated in FIG. 1). In this embodiment, the harness attachment 716 can include two or more apertures (i.e., a first aperture 749F and a second aperture 749S) spaced some distance apart, similar to a "FIG. 8" piece, for example. The tether 714 can be inserted through the apertures 749F, 749S while still allowing the harness attachment 716 to slide or move along the tether 714. The snout harness can then be formed by pulling the portion of the tether 714 between the apertures 749F, 749S substantially perpendicular from the harness attachment 716 (in the direction of arrow 750, for example) forming a harness loop 751. The harness loop 751 can then be placed to encircle and/or tighten around the snout or muzzle of the dog 12. In some embodiments, the harness attachment 716 may also be used in conjunction with other components of the leash system 10, such as the latch assemblies 18F, 18S (illustrated in FIG. 1), to form the snout harness. It is understood that the harness attachment 716 can include additional components than those specifically illustrated and described herein.

In alternative embodiments, the harness attachment 716 can include one or more straps, clips or flat fabric, as non-exclusive examples. For example, in such alternative embodiments, the harness attachment 716 can be coupled, connected or secured to the tether 714 at some distance apart, but loose enough to allow the harness attachment 716 to slide or move along the tether 714. The tether 716 can be formed into the harness loop 751 to encircle the snout or muzzle of the dog 12. The harness loop 751 can then be tightened around the snout or muzzle of the dog 12 by sliding the two ends of the harness attachment 716 towards each other until desired snugness or tightness is achieved. Additionally, and/or alternatively, the harness attachment 716 can include any other suitable design.

Figure 8:
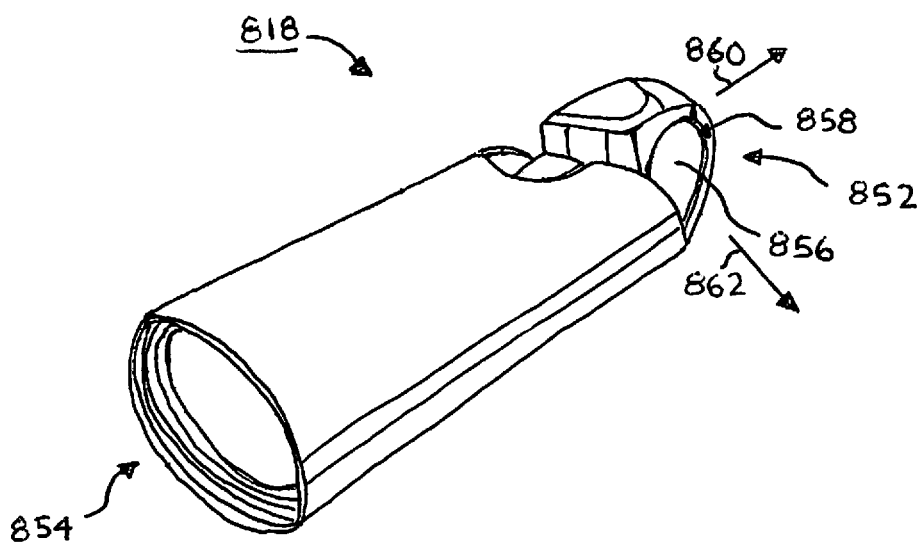
FIG. 8 is a perspective view of one embodiment of a latch assembly of the leash system.

FIG. 8 is a perspective view of one embodiment of the latch assembly 818. The design of the latch assembly 818 can vary. In the embodiment illustrated in FIG. 8, the latch assembly 818 can include a latching end 852 and a latch attachment end 854. It is understood that the latch assembly 818 can include fewer or additional components than those specifically illustrated and described herein.

The latching end 852 of the latch assembly 818 can be configured to latch or clasp to various locations on the tether 14 (illustrated in FIG. 1). In certain embodiments, the latching end 852 can include a latch cavity 856 having a latch cavity diameter 858. In such embodiments, the latch cavity diameter 858 can be substantially similar to or the same as the diameter of the tether 14. Accordingly, the latch cavity diameter 858 and the diameter of the tether 14 may deviate by approximately 1 mm, 2 mm, 3 mm, etc., for example, and remain substantially similar. Alternatively, the size, shape and/or design of the latch cavity 856 can vary depending on the design and/or shape of the tether 14. As such, the latch cavity 856 can include any other dimension substantially similar to the tether 14.

Additionally, the latch cavity diameter 858 can include relatively sharp edges, which can cause increased friction when the latching end 852 is latched or clasped to the tether 14. For example, as the tether 14 is pulled substantially perpendicular (i.e., in the direction of arrow 860, for example) relative to a point where the latching end 852 is latched or clasped to the tether 14, friction may increase as the pulling force increases, which can prevent the latch assembly 818 from moving or slipping. In other words, the relatively sharp edges of the latch cavity diameter 858 can fasten to or grip the tether 14. Alternatively, the tether 14 can move freely within the latch cavity 856 when pulled through in a substantially parallel direction (i.e., in the direction of arrow 862, for example).

This configuration can allow the latch assembly 818 to create an adjustable loop (not shown) with the tether 14. The adjustable loop can include varying sizes. As such, the latch assembly 818 can be latched or clasped onto the tether 14 to encircle and/or tightened around various fixed or movable objects without the use of a knot, which can include a waist or other body part of the user, or a pole, a tree or a table leg, as non-exclusive examples. This not only creates an easier and quicker way to attach or secure the tether 14 to fixed or movable objects, but it also can inhibit the tether 14 from resting on the ground to limit the potential of trip hazards, leash tangling, or the dog 12 (illustrated in FIG. 1) urinating on the tether 14.

The latch attachment end 854 can be coupled and/or connected to either the first tether end 24F (illustrated in FIG. 1) or the second tether end 24S (illustrated in FIG. 1). In one embodiment, the latch attachment end 854 may be connected to at least a portion of the connector assemblies 22F, 22S (illustrated in FIG. 1). Alternatively, the latch attachment end 854 may be coupled and/or connected to any other suitable structure or component of the leash system 10.

In an alternative embodiment, the latch assembly 818, i.e., the latching end 852, can include an inner cylinder (not shown) and an outer cylinder (not shown). The inner cylinder and the outer cylinder can include an inside cylinder diameter and an outside cylinder diameter. The outside diameter of the inner cylinder can be substantially similar to the inside diameter of the outer cylinder. In such embodiment, the outer cylinder substantially encircles at least a portion of the inner cylinder.

The inner cylinder can be inclined towards one end. Both the inner and outer cylinders can also have openings (i.e., inner cylinder opening, outer cylinder opening). For example, the inner cylinder opening can include an opening located near one end of the inner cylinder that is perpendicular to the length of the inner cylinder and whose diameter is substantially similar to the inside diameter of the inner cylinder. The outer cylinder opening can also include an opening that is perpendicular to the length of the outer cylinder and whose diameter is substantially similar to the inside diameter of the outer cylinder. The outer cylinder opening can be located at a point where the inner cylinder opening lines up when pulled towards one end. More specifically, when pulled towards one end, the inner cylinder can become parallel to the outer cylinder to create the opening by causing the inner cylinder opening and the outer cylinder opening to line up. The inner cylinder can then return to a closed or resting position, which is inclined by a spring or a magnet towards one end. This configuration allows the inner cylinder opening and/or the outer cylinder opening to serve as entry and/or exit points, which can create a gate that becomes closed to an inside wall of the outer cylinder.

In another alternative embodiment, the latching end 952 of the latch assembly 818 can include the latch cavity 856. In such embodiment, the latch cavity 856 can be circular having the latch cavity diameter 858 that is substantially similar to the tether 14. Accordingly, the latching end 852 can engage or contact the tether 14. The latching end 852 can also include one or more curved gates (not shown) that allow the tether 14 to enter the latch cavity 856. The dimensions of the curved gates can vary, but can be substantially similar to the latch cavity diameter 858. The points of entry and exit (not shown) of the tether 14 can be closed and opened by the curved gates, which can be secured by tracks (not shown) that guide the curved gates on a defined path, and which can be located on the latch assembly 818.

Still in another alternative embodiment the latching end 852 of the latch assembly 818 can utilize two claws that join to make a closed circle or ring to latch or clasp onto the tether 14.

Figure 9A:
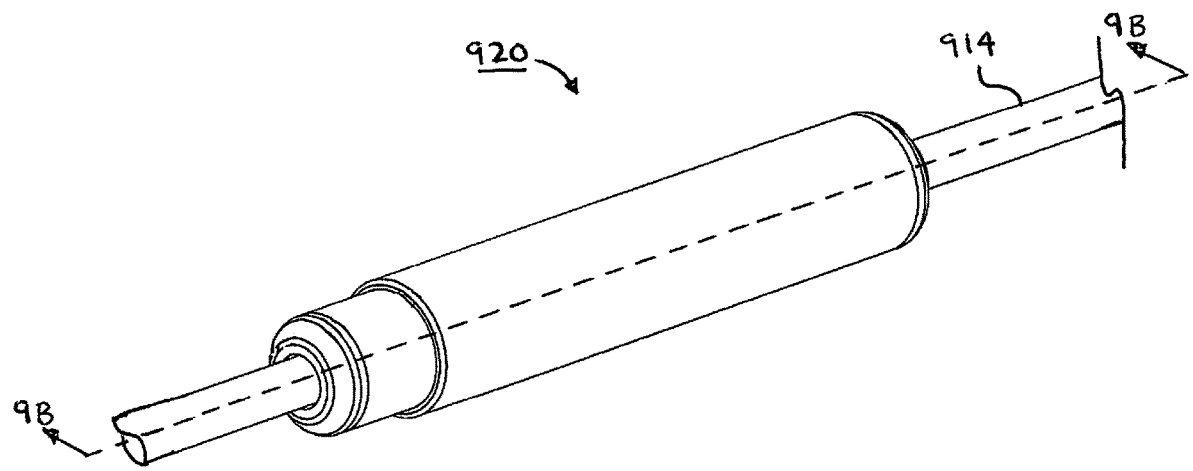
FIG. 9A is a perspective view of one embodiment of a handle assembly of the leash system.

FIG. 9A is a perspective view of one embodiment of the handle assembly 920. In certain embodiments, such as the embodiment in FIG. 9A, the handle assembly 920 can have a somewhat cylindrical shape or configuration. Alternatively, the handle assembly 920, can include any other suitable configuration or shape, such as a sphere, for example. In this embodiment, the handle assembly 920 is coupled to and/or engaged with the tether 914. The handle assembly 920 can be coupled to and/or engaged with the tether 914 via any suitable manner or method.

Figure 9B:
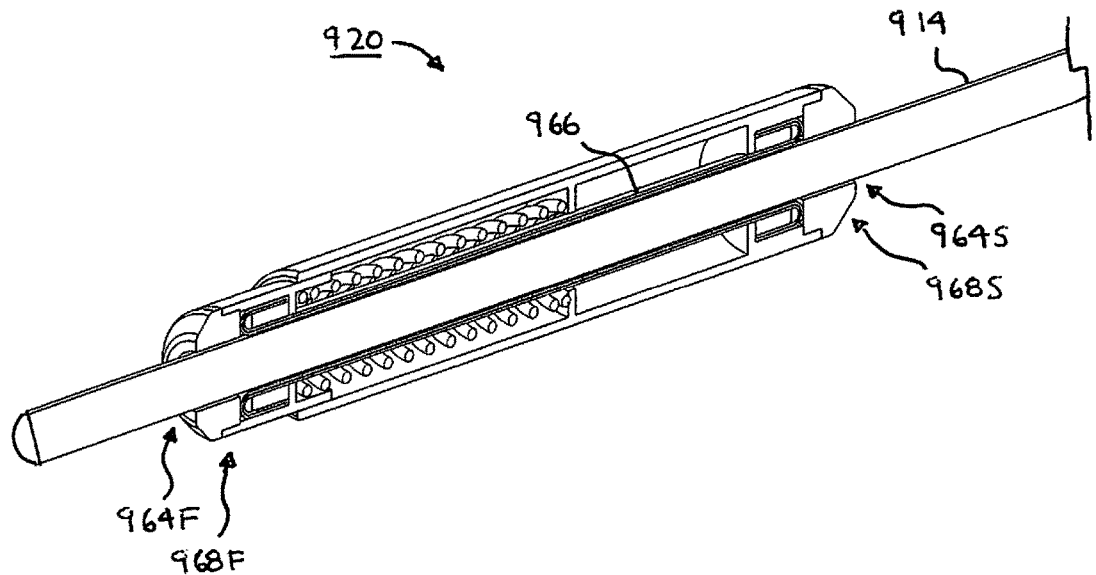
FIG. 9B is a simplified cross-sectional view of the handle assembly taken on line 9B-9B in FIG. 9A.

FIG. 9B is a cross-sectional view of the embodiment of the handle assembly 920 in FIG. 9A taken on line 9B-9B. In FIG. 9B, the handle assembly 920 can include a first aperture 964F on one side of the handle assembly 920, a second aperture 964S opposite the first aperture 964F and a tether lumen 966, all of which can allow the tether 914 to pass through an interior of the handle assembly 720. It is understood that the handle assembly 920 can include fewer or additional components than those specifically illustrated and described herein.

The first aperture 964F on a first handle end 968F and a second aperture 964S on a second handle end 968S can allow the tether 914 to enter and exit the interior of the handle assembly 920, respectively. The first aperture 964F and/or the second aperture 964S can include a diameter or any other dimension substantially similar to the tether 914. Further, the size, shape and/or design of the first aperture 964F and/or the second aperture 964F can vary depending on the design and/or shape of the tether 914.

The tether lumen 966 extends from at least a portion of the first handle end 968F to at least a portion of the second handle end 968F and can allow the handle assembly 820 to slide onto either end of the tether 914, e.g., first tether end 24F (illustrated in FIG. 1) and the second tether end 24S (illustrated in FIG. 1). Accordingly, the tether lumen 966 can include a diameter or any other dimension substantially similar to the tether 914. With such configuration, the handle assembly 920 can slide or move on the tether 914 to various locations between the first tether end 24F and the second tether end 24S. The tether lumen 966 can be formed from any suitable material, which may include a plastic, nylon or carbon fiber, as non-exclusive examples.

Additionally, the handle assembly 920 can also be configured to engage, grip or lock to the tether 914 at various locations between the first tether end 24F and the second tether end 24S. For example, in certain embodiments, the tether lumen 966 can be flexible such that the tether lumen 966 can engage, grip or lock on to the tether 914 when the handle assembly 920 is manipulated, i.e., by squeezing, pushing, sliding, pulling, etc., a portion of the handle assembly 920. More specifically, in one embodiment, when the handle assembly 920 is manipulated, the tether lumen 966 can create friction with the tether 914 for the purpose of inhibiting the handle assembly 920 from slipping or moving. In another embodiment, when the handle assembly 920 is manipulated, the tether lumen 966 can be placed in tension against the tether 914 for the purpose of inhibiting the handle assembly 920 from slipping or moving (i.e., in a manner similar to the function of a "Chinese finger trap"). Alternatively, the handle assembly 920 can be manipulated to inhibit the handle assembly 920 from slipping or moving via any suitable manner. Furthermore, when the handle assembly 920 is not manipulated to inhibit the handle assembly 920 from slipping or moving, the handle assembly 920 can manually slide or move between the first tether end 24F and the second tether end 24S.

In one embodiment, the handle assembly 920 can remain static. For example, the handle assembly 920 can be used in conjunction with other components of the leash system 10, such as the latch assemblies 18F, 18S (illustrated in FIG. 1), in a fashion similar to a handle, such as a water ski handle, for example.

Figure 10A:
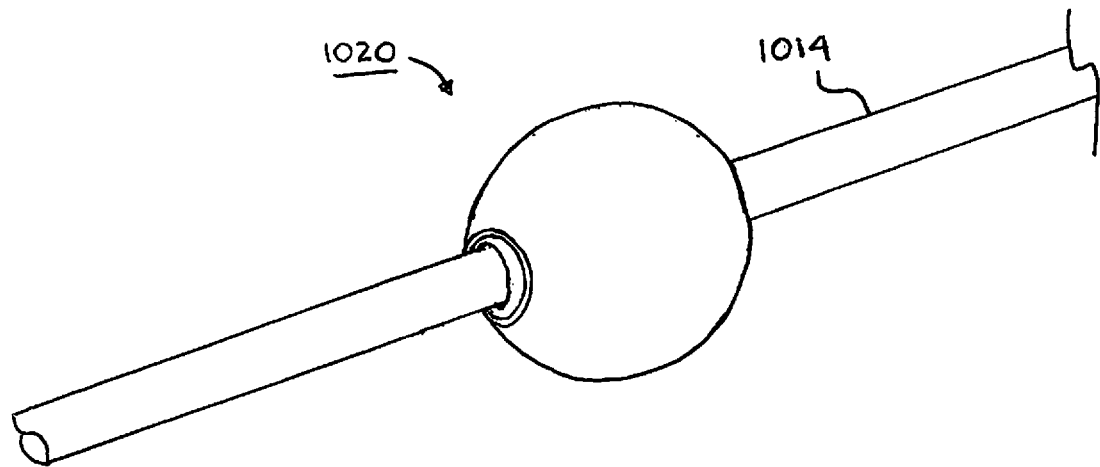
FIG. 10A is a perspective view of another embodiment of the handle assembly of the leash system.

FIG. 10A is a perspective view of another embodiment of the handle assembly 1020. In certain embodiments, such as the embodiment in FIG. 10A, the handle assembly 1020 can have the somewhat spherical shape or configuration. In this embodiment, the handle assembly 1020 is coupled to and/or engaged with the tether 1014. The handle assembly 1020 can be coupled to and/or engaged with the tether 1014 via any suitable manner or method.

Figure 10B:
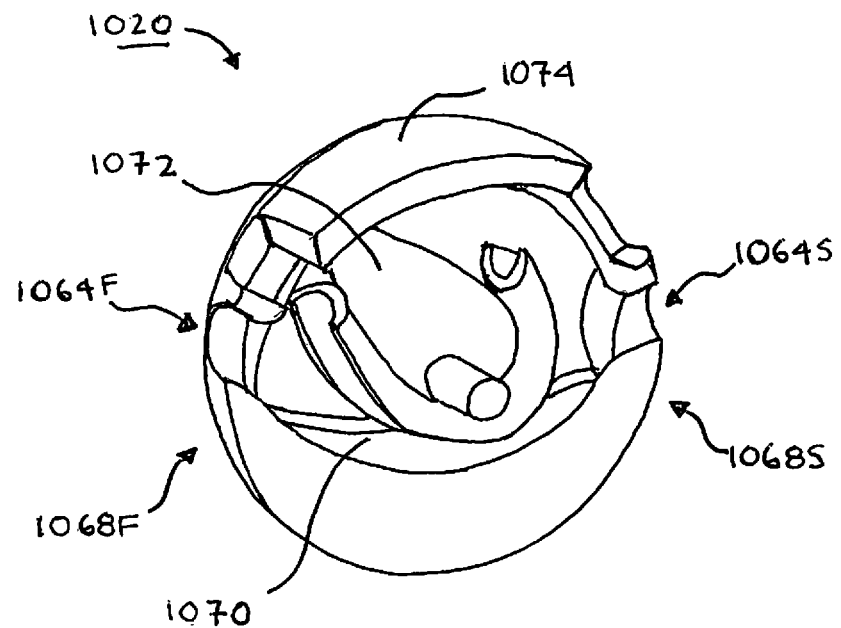
FIG. 10B is a partial cutaway view of an embodiment of the handle assembly.

FIG. 10B is a partial cutaway view of an embodiment of an interior of the handle assembly 1020. In FIG. 10B, the handle assembly 1020 can include the first aperture 1064F on the first handle end 1068F, the second aperture 1064S on the second handle end 1068S opposite the first aperture 1064F, a tether track 1070 and a tether cam 1072. For ease of reference, the tether 1014 (illustrated in FIG. 10A) has been omitted.

The first aperture 1064F on the first handle end 1068F and the second aperture 1064S on a second handle end 1068S can allow the tether 1014 to enter and exit the interior of the handle assembly 1020, respectively.

In this embodiment, rather than having a tether lumen 966 (illustrated in FIG. 9B), the handle assembly 1020 can include the tether track 1070 that can extend from at least a portion of the first handle end 1068F to at least a portion of the second handle end 1068S. The tether track 1070 can encircle at least a portion of the tether 1014, creating a path which can guide or direct the tether 1014 through the interior of the handle assembly 1020. Further, the tether track 1070 can allow the tether 1014 to slide or move within the handle assembly 1020. The configuration and/or design of the tether track 1070 can vary, i.e., depending on the design and/or shape of the tether 1014, for example.

The tether cam 1072 can be configured to engage, grip or lock to the tether 1014. In various embodiments, the tether cam 1072 can include or integrate at least a portion of the tether track 1070, such that the tether cam 1072 can partially serve as a path to guide or direct the tether 1014 through the interior of the handle assembly 1020. In certain embodiments, the tether cam 1072 can engage, grip or lock on to the tether 1014 when the handle assembly 1020 is manipulated, i.e., by squeezing, pushing, sliding, pulling, etc., a portion of the handle assembly 1020. More specifically, when the handle assembly 1020 is manipulated, the tether cam 1072 can function to engage, grip or lock down on the tether 1014 for the purpose of inhibiting the handle assembly 1020 from slipping or moving. Alternatively, the handle assembly 1020 can be manipulated to allow the handle assembly 1020 to slide or move between the first tether end 24F (illustrated in FIG. 1) and the second tether end 24S (illustrated in FIG. 1).

In one embodiment, the handle assembly 1020 can include a slidable element 1074, wherein the slidable element 1074 can be manipulated or selectively slid to discrete positions within a slot to cause the tether cam 1072 to engage, grip or lock down on the tether 1014 for the purpose of inhibiting the handle assembly 1020 from slipping or moving. Alternatively, the slidable element 1074 can be manipulated or selectively slid to discrete positions within the slot to cause the tether cam 1072 to allow the tether 1014 to move freely within the interior of the handle assembly 1020.

In various embodiments, the handle assembly 1020 can remain static. In such embodiments, the handle assembly 1020 can be coupled or connected to the first tether end 24F or the second tether end 24S. The handle assembly 820 may be coupled or connected to the tether ends 24F, 24S via any suitable manner or method. Specifically, the handle assembly 1020 may include and/or integrate at least a portion of the connector assembly 222 (illustrated in FIGS. 2A-2C), which can allow the handle assembly 1020 to be coupled or connected to portions of the leash system 10 via the connector assembly 222.

It is understood that this disclosure further includes any method for manufacturing the different embodiments of the connector assembly of the leash system mentioned and/or described herein.

It is further understood that although a number of different embodiments of the connector assembly of the leash system have been illustrated and described herein, one or more features of any one embodiment can be combined with one or more features of one or more of the other embodiments, provided that such combination satisfies the intent of the present invention.

While a number of exemplary aspects and embodiments of the connector assembly of the leash system have been shown and disclosed herein above, those of skill in the art will recognize certain modifications, permutations, additions and sub-combinations thereof. It is therefore intended that the consumable shall be interpreted to include all such modifications, permutations, additions and sub-combinations as are within their true spirit and scope, and no limitations are intended to the details of construction or design herein shown.

What is claimed is:

1. A connector assembly for a leash system, the connector assembly comprising:
    a connector including a first connector end, the first connector end having a connector end center; and
    a connector receiver including a first gate that rotates about a pivot axis between a locked position and an unlocked position, the first gate defining at least a portion of a connector cavity that selectively receives the first connector end when the first gate is in the unlocked position, the connector cavity having a cavity center, wherein the connector end center and the cavity center are substantially identical when the first connector end is received by the connector cavity, wherein the pivot axis extends through the connector cavity.

2. The connector assembly of claim 1 wherein the first connector end has a somewhat spherical configuration.

3. The connector assembly of claim 2 wherein the connector cavity has at least a partially spherical shape.

4. The connector assembly of claim 3 wherein the first connector end has a diameter that is substantially similar to a diameter of the connector cavity.

5. The connector assembly of claim 1 wherein the connector receiver further includes a receiver assembly, the receiver assembly including a receiver actuator that is coupled to and moves the first gate between the locked position and the unlocked position.

6. The connector assembly of claim 5 wherein the receiver actuator includes one of a switch, a lever, a button and a slidable element.

7. The connector assembly of claim 5 wherein the receiver assembly is configured to allow insertion of the first connector end into the connector cavity absent manual movement of the receiver actuator.

8. The connector assembly of claim 5 wherein the receiver actuator is biased in a first direction that selectively maintains the first gate in the locked position.

9. The connector assembly of claim 5 wherein the receiver actuator is movable in a second direction that moves the first gate to the unlocked position.

10. The connector assembly of claim 5 wherein the connector receiver includes a first gate attachment member that couples the first gate to the receiver actuator.

11. The connector assembly of claim 1 wherein the first gate is biased towards the locked position.

12. The connector assembly of claim 1 wherein the connector receiver includes a second gate that is coupled to the first gate, the second gate forming at least a portion of the connector cavity.

13. The connector assembly of claim 12 wherein the first gate and the second gate are configured to engage at least a portion of the first connector end.

14. The connector assembly of claim 13 wherein the connector receiver has a pivot axis, and wherein the first gate and the second gate rotate about the pivot axis.

15. The connector assembly of claim 14 wherein the connector receiver has a longitudinal axis, and wherein the pivot axis is substantially perpendicular to the longitudinal axis.

16. A connector assembly for a leash system, the connector assembly comprising:

a connector including a first connector end; and a connector receiver including (i) a first gate that moves between a locked position and an unlocked position, (ii) a longitudinal axis, (iii) a pivot axis that is substantially perpendicular to the longitudinal axis, and (iv) a first gate attachment member rotatably attached to the first gate, the first gate defining at least a portion of a connector cavity that selectively receives the first connector end when the first gate is in the unlocked position, wherein the first gate rotates about the pivot axis when moving between the locked position and the unlocked position.

17. The connector assembly of claim 16 wherein the first connector end has a somewhat spherical configuration including a connector end center, and the connector cavity has at least a partially spherical shape including a cavity center.

18. The connector assembly of claim 17 wherein a diameter of the first connector end is substantially similar to a diameter of the connector cavity.

19. The connector assembly of claim 18 wherein the connector end center and the cavity center are substantially identical when the connector cavity has received the first connector end.

20. A connector assembly for a leash system, the connector assembly comprising:

a connector including a first connector end, the first connector end having a somewhat spherical configuration; and a connector receiver including (i) a first gate and a second gate, (ii) a receiver actuator that is coupled to the first gate and the second gate, the receiver actuator selectively moving the first gate and the second gate between a locked position and an unlocked position, (iii) a longitudinal axis, and (iv) a pivot axis that is substantially perpendicular to the longitudinal axis;

wherein the first gate and the second gate are biased toward the locked position, the first gate and the second gate defining at least a portion of a connector cavity that selectively receives the first connector end when the first gate and the second gate are in the unlocked position, the connector cavity having at least a partially spherical shape, and wherein the connector cavity has a diameter that is substantially similar to a diameter of the first connector end.

* * * * *